United States Patent [19]

Matsuura et al.

[11] Patent Number: 4,717,911
[45] Date of Patent: Jan. 5, 1988

[54] TECHNIQUE FOR CHAINING LINES OF A DOCUMENT TOGETHER TO FACILITATE EDITING OR PROOFREADING

[75] Inventors: Kaneo Matsuura; Masami Chikauchi, both of Hamuramachi, Japan

[73] Assignee: Casio Computer Co., Ltd., Tokyo, Japan

[21] Appl. No.: 697,773

[22] Filed: Feb. 4, 1985

[30] Foreign Application Priority Data

Feb. 4, 1984 [JP] Japan ................................. 59-18809

[51] Int. Cl.$^4$ .............................................. G09G 1/00
[52] U.S. Cl. ..................................... 340/724; 340/709
[58] Field of Search ............... 340/724, 726, 709, 744, 340/748, 750

[56] References Cited

U.S. PATENT DOCUMENTS 4,404,554 9/1983 Tweedy, Jr. et al. ............... 340/726
4,553,261 11/1985 Froessl ................................ 340/709

OTHER PUBLICATIONS

*The Lisa Computer System;* Williams; Byte Magazine, Feb. 1983, pp. 33–50.

*Primary Examiner*—Marshall M. Curtis
*Attorney, Agent, or Firm*—Frishauf, Holtz, Goodman & Woodward

[57] ABSTRACT

A document creating and editing apparatus operates in such a manner that information before editing or proofreading registered in a document memory is left at the time of the editing or proofreading, while only the area of an edited or proofread portion is registered in the document memory, that an editing or proofreading pointer is generated simultaneously with the registration of the area of the edited or proofread portion, and that the respective lines of a document before or after the editing or proofreading are chained in single memory block unit.

12 Claims, 12 Drawing Figures

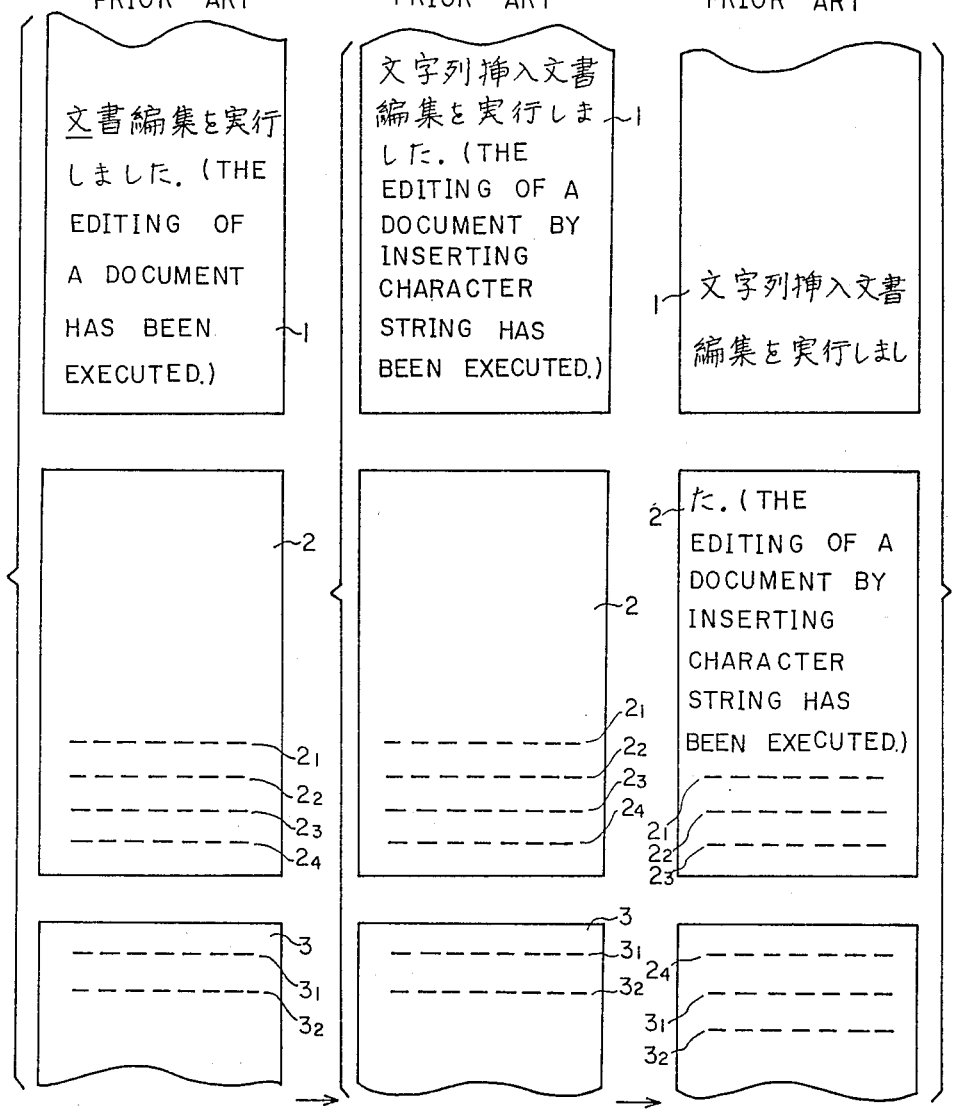

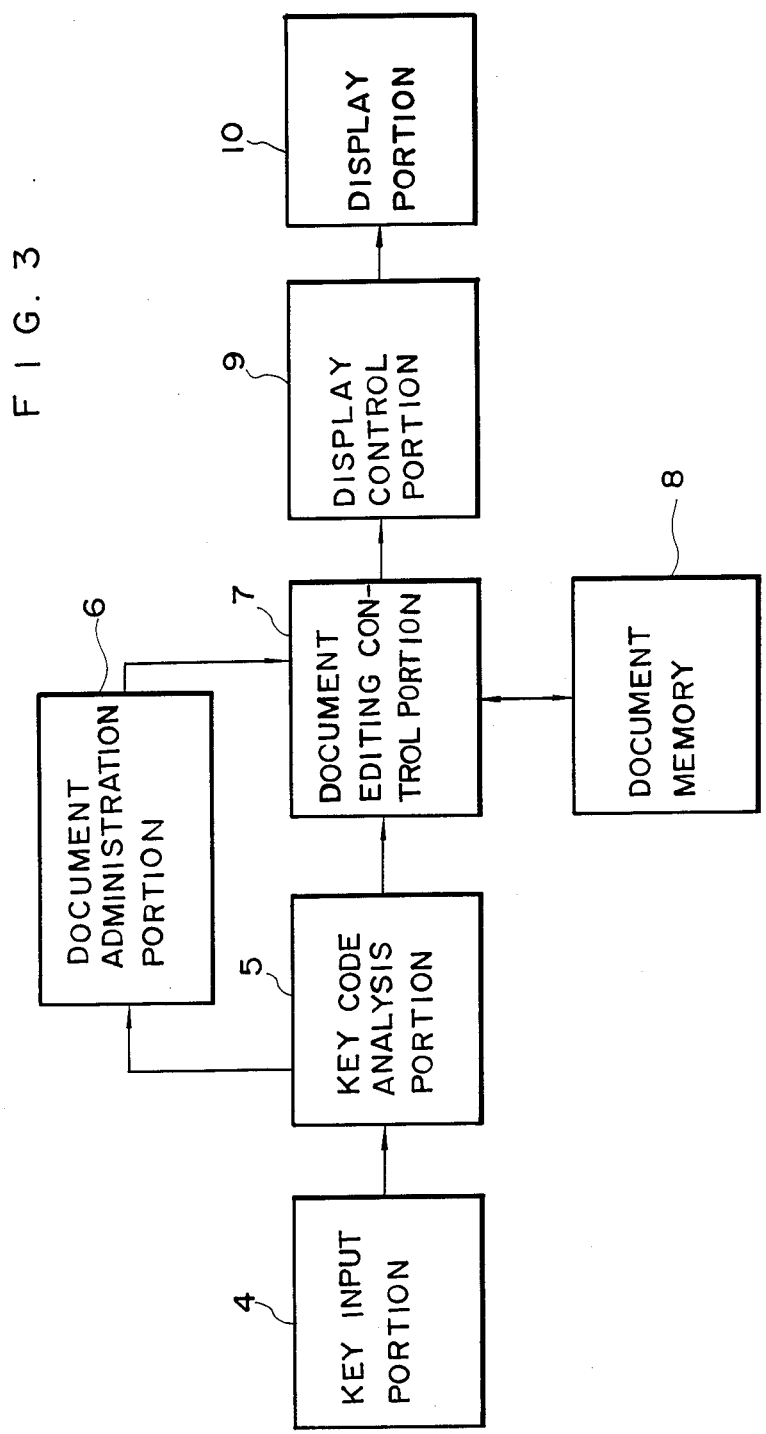

TECHNIQUE FOR CHAINING LINES OF A DOCUMENT TOGETHER TO FACILITATE EDITING OR PROOFREADING

BACKGROUND OF THE INVENTION

The present invention relates to a word processor in the Japanese language or another language such as English, and more particularly to a document creating and editing apparatus which has an enhanced editing performance.

In order to enhance the editing performance of a word processor, word processors furnished with various functions have recently been proposed. There has been known, for example, a page administration function by which a page to be seen, such as the previous page or next page of a document displayed on a display screen, can be immediately called and displayed. In the editing of a document, the document proofreading or editing performance is very important for making up the format of the document and determining the arrangement of an expression. In this regard, there has been the problem that when a character string is subjected to an alteration such as correction, addition or deletion, the arrangement of an expression on the next page may change greatly.

The above problem will be explained with reference to FIGS. 1A and 1B. In these figures, numerals 1, 2 and 3 designate first to third pages on printed out paper or on the display screen of a CRT or the like. Symbol 1a denotes the boundary between the first page and the second page, and symbol 2a the boundary between the second page and the third page. It is now assumed that, as shown in FIG. 1A, a sentence '文書編集を実行しました.' ('The editing of a document has been executed.') is written at the last line and the second-last line of the first page 1, sentences $2_1$, $2_2$, $2_3$ and $2_4$ of four lines being written on the second page 2, sentences $3_1$ and $3_2$ of two lines being written on the third page 3. By way of example, it is considered that a cursor position indicated by '文' ('sentence') has five characters ('文字列挿入' ('inserting a character string') added thereto. Then, as shown in FIG. 1B, a character and a punctuation mark 'た.' ('hiragana "ta" and a period') overflow the last line of the first page 1 to come to the first line of the second page 2, and the sentences $2_1$, $2_2$ and $2_3$ having been at the first to third lines are still included in the second page 2, but the sentence $2_4$ of the fourth line shifts to the first line of the third page 3. That is, the proofreading such as the addition or deletion of characters into or from a sentence results in changing the boundaries of pages from those shown in FIG. 1A before the editing or proofreading, and the arrayal of characters of each page behind the proofread position is discrepant by at least one line as compared with the state before the proofreading. Therefore, the positions of the same character string before and after the editing or proofreading differ in page and line. This has led to the disadvantage that a character string is difficult to find when editing is performed later.

Further, there has been known another editing system wherein a document is edited in single page unit. According to this system, in a case where a cursor position '文' ('sentence') in a sentence '文書編集を実行しました.' ('The editing of a document has been executed.') on a first page 1 shown in FIG. 2A has '文字列挿入' ('inserting a character string') added thereto as shown in FIG. 2B, the first page 1 expands to absorb increase in the number of lines and to exert no influence on a second page 2 and a third page 3, and an operation called page make-up is finally performed to fix true boundaries as shown in FIG. 2C. This system, however, has had the disadvantage that how the result of the editing has changed as the whole document cannot be acknowledged instantly.

Moreover, the systems shown in FIGS. 1A and 1B and in FIGS. 2A to 2C have had the drawback that, once the editing has been executed, the document cannot be restored into its original state.

SUMMARY OF THE INVENTION

The present invention has been made in view of the disadvantages of the prior arts, and has for its object to provide a document creating and editing apparatus which makes it possible to see both a document after editing or proofreading and a document before the editing or proofreading at any time and also to readily restore the original document when an edited or proofread result is unsatisfactory, without requiring a large memory capacity.

According to the present invention, the object is accomplished in such a way that information before editing or proofreading registered in a document memory is left at the time of the editing or proofreading, while only the area of an edited or proofread portion is registered in the document memory, that an editing or proofreading pointer is generated simultaneously with the registration of the area of the edited or proofread portion, and that the respective lines of a document before or after the editing or proofreading are chained in single memory block unit.

In one aspect of performance of the present invention, an apparatus wherein document data is applied by input means and wherein it is edited or proofread and then displayed is so constructed and operated that the lines of the document data applied by the input means are chained with each line as one memory block and are stored in storage means, that when the stored document data has been edited or proofread, the data blocks before and after the editing or proofreading are chained in accordance with pointers and are stored in the storage means, and that when the document data is to be displayed, a command applied from the input means is analyzed to discriminate whether the document data before or after the editing or proofreading is to be displayed, whereupon using flags included in the data blocks, the corresponding chained data blocks are displayed by display means.

BRIEF DESCRIPTION OF THE DRAWINGS

FIG. 1A is a plan view of the display of a display screen in a prior-art word processor before editing or proofreading, while

FIG. 2A is a plan view of display before editing or proofreading for explaining the editing or proofreading system of another prior-art word processor, FIG. 2B is a plan view of the display subjected to revision, and FIG. 2C is a plan view of the display subjected to page make-up;

FIG. 3 is a block diagram showing a word processor embodying the present invention;

FIG. 4A is a diagram of a memory chain structure before editing or proofreading for explaining the memory arrangement of line blocks within the document memory of the word processor of the present invention, the line blocks being stored in single line unit, while

PREFERRED EMBODIMENT OF THE INVENTION

Figure 1A:
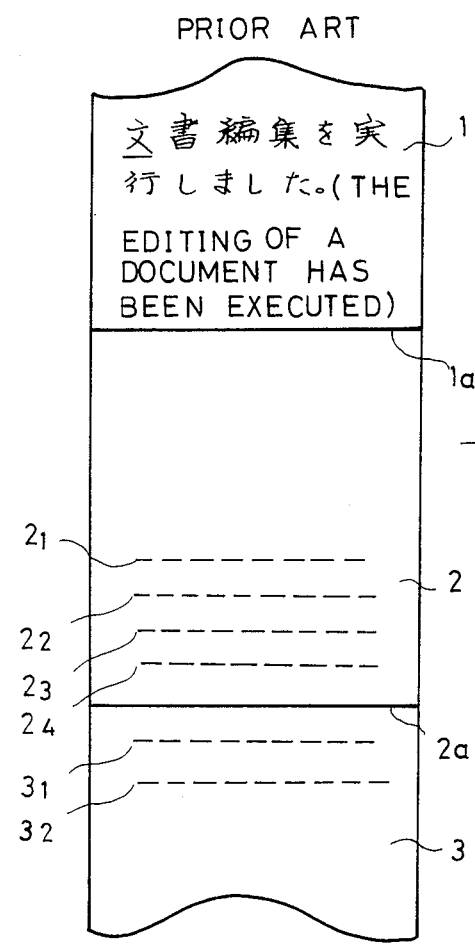
Figure 1B:
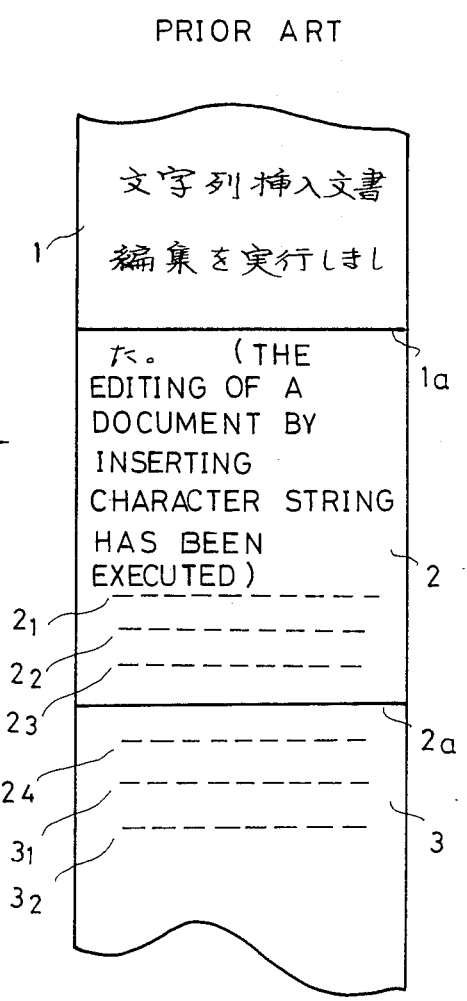
FIG. 1B is a plan view of the display after the editing or proofreading has been performed.

Now, one embodiment of the present invention will be described in detail with reference to FIGS. 3 to 7.

FIG. 3 is a block diagram for explaining the editing performance of a word processor according to the present invention. In the figure, numeral 4 designates a key input portion, and numeral 5 a key code analysis portion. The key code analysis portion 5 performs the code analyses of keys depressed in the key input portion 4, for example, the separation between data and a command and the decoding of the command, and it delivers the results to a document administration portion 6 as well as a document editing control portion 7. The document administration portion 6 stores, for example, the head storage addresses of the flags of new and old sentences in display, and it delivers the data of the flags to the control portion 7 in correspondence with a code, for example, command applied from the key code analysis portion 5. The document editing control portion 7 receives the data from the document administration portion 6 and the data within the document memory 8 and supplies them through a display control portion 9 to a display portion 10, which displays document data.

Figure 4A:
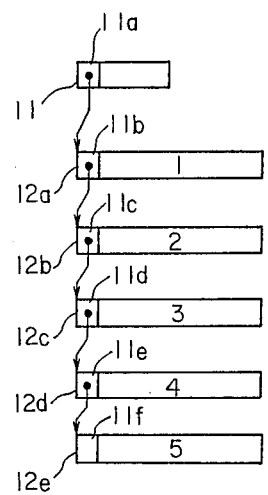
Figure 4B:
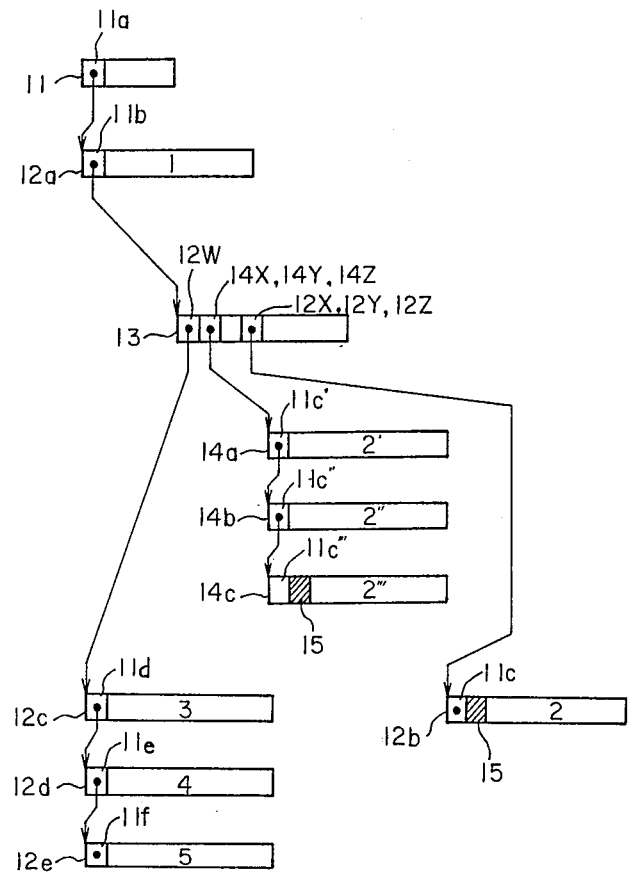
FIG. 4B is a diagram of a memory chain structure after the editing or proofreading.

FIGS. 4A and 4B show memory chain structures before and after editing or proofreading within the document memory 8 in the present invention, respectively.

In the chain structure before editing or proofreading illustrated in FIG. 4A, numeral 11 designates a base pointer which has information for pointing a succeeding line block. Symbols 12a, 12b, 12c, 12d and 12e denote line blocks which are stored with each line of a sentence as one block, that is, which are the respective memory areas of first to fifth lines. The information 11a in the base pointer 11 and information items 11b, 11c, 11d, 11e and 11f for pointing the next lines of the corresponding line blocks function to chain the first to fifth lines in succession from the beginning of a document as indicated by arrows, so as to read the document as the successive first, second, third, fourth and fifth lines or display it as them on a display screen.

Shown in FIG. 4B is the chain structure in the case where, by way of example, the line block 12b of the second line in the foregoing chain structure before the editing or proofreading has lines added thereto by insertion. The same portions as in FIG. 4A are assigned the same symbols, and shall not be repeatedly explained. When the editing or proofreading has been executed, an edit or proofread pointer 13 is generated. The edit or proofread pointer 13 has the head information 14X of chained new line blocks 14a, 14b and 14c after the editing or proofreading, the edit or proofread starting character position information 14Y thereof, and the edit or proofread ending character position information 14Z thereof. Further, it has the head information 12X of the old line block 12b before the editing or proofreading, the edit or proofread starting character position information 12Y thereof, and the edit or proofread ending character position information 12Z thereof. In addition, it holds the front end information 12W of the next line block 12c which has no influence on the editing or proofreading.

The new line blocks 14a, 14b and 14c are read out on the basis of the respective information items 14X, 14Y and 14Z, and they are chained. Symbols 11c', 11c'' and 11c''' denote address information items for pointing the next new line blocks. The old line block 12b is also read out on the basis of the information items 12X, 12Y and 12Z and they are chained. Further, the line blocks 12c, 12d and 12e having no influence on the editing or proofreading are chained by the information 12W. Numeral 15 indicates line block end information.

The line block chaining operation of the document editing control portion 7 at the time of the editing or proofreading will be described in conjunction with flow charts shown in FIGS. 5A and 5B. First, when the editing or proofreading has been started at Step 16, an edit or proofread starting position is applied as an input at Step 17. Now, a case is considered where the second line is increased by two lines by insertion. The edit or proofread pointer 13 is gotten in the document memory 8 at Step 18, followed by Step 19 which couples the edit or proofread pointer 13 between the first line block 12a and the second line block 12b as illustrated in FIG. 4B. Subsequently, a new line block 2' is gotten in the memory at Step 21, and a line block 2 is edited to create the new line block 2' at Step 22. Thus, the new block 2' with characters inserted in the line block 2 is obtained as shown in FIG. 4B.

Next, the line block 2' is coupled to the edit pointer at Step 23, and whether or not the editing has ended is checked at Step 20.

When the result of Step 20 is "NO", that is, when the editing has not ended, a line block 2'' increased in consequence of the insertion of characters is gotten similarly to the above at Step 21a. Besides, the line block 2'' is created at Step 22a and is coupled to the pointer of the preceding line block 2' at Step 23a. By successively repeating such operations 21a–23a, a line block 2''' is created and coupled. Thus, the new line blocks 14a, 14b and 14c are held in the memory. When the editing has ended, Step 24 sets the block end information 15 in the last line block which is the new line block 14c.

The next step 25 sets the line block end information 15 in the last line block 12b of the old line block chain which needs to be edited.

Next, the edit or proofread pointer 13 points the old line block 12b at Step 26, to chain it with the information items 12X, 12Y and 12Z. Further, the edit or proofread pointer 13 is set at Step 27 in order to point the line block 12c which is not affected by the editing or proofreading, whereupon the editing or proofreading ends as indicated at numeral 28. When the editing or proofreading has ended in this manner, the memory block chain is completed as shown in FIG. 4B. The document display after the editing or proofreading is controlled by the document administration portion 6 shown in FIG. 3, and the edited block chain is taken out and displayed.

Figure 5A:
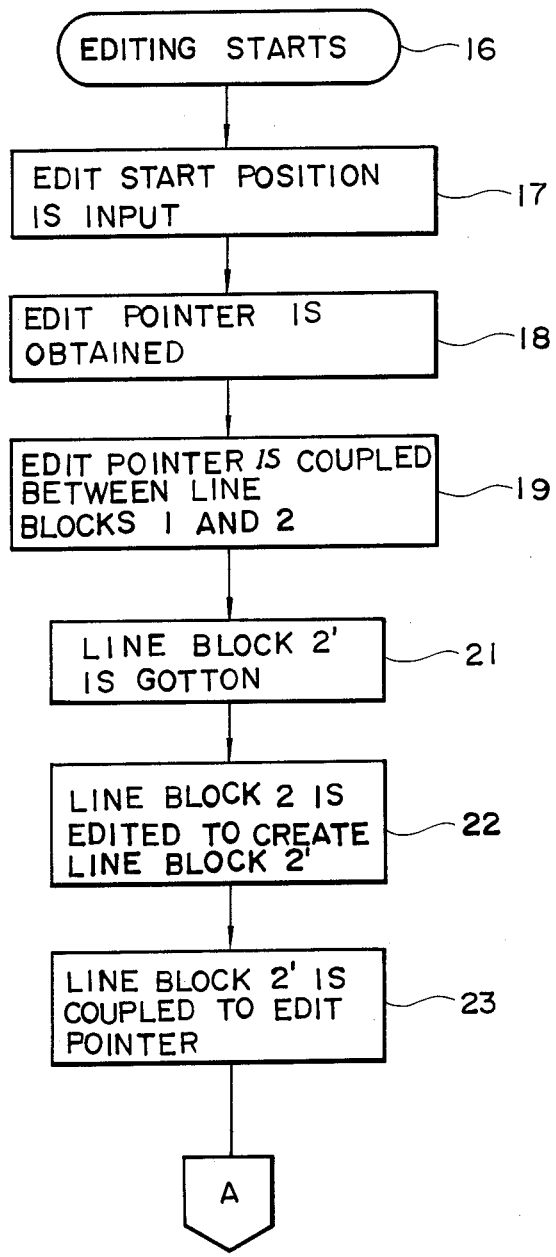
FIGS. 5A and 5B are flow charts for explaining the editing or proofreading operation illustrated in FIGS. 4A and 4B.
Figure 5B:
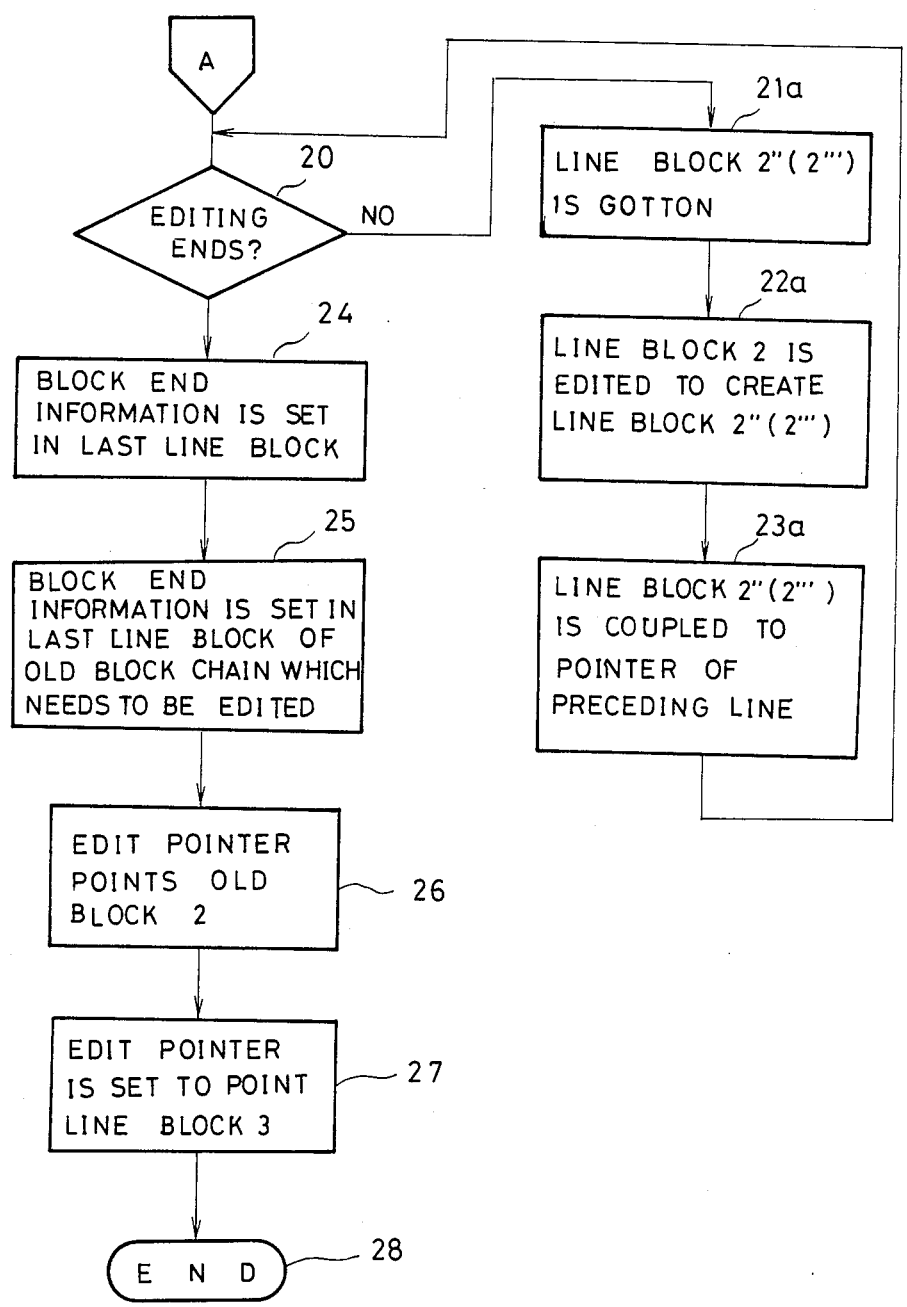

In the illustration of FIGS. 5A and 5B, the new line block chain has consisted of three lines. However, the number of lines is not restricted to three, but the operations 21a-23a may be repeated a required number of times.

In the foregoing control flow, the input of the edit starting position at Step 17, etc. are executed by the application from the key input portion 4. All the executive operations are driven by interrupts etc.

Now, display at the time at which a display starting command has been applied as an input will be described with reference to FIGS. 6 and 7.

Figure 6:
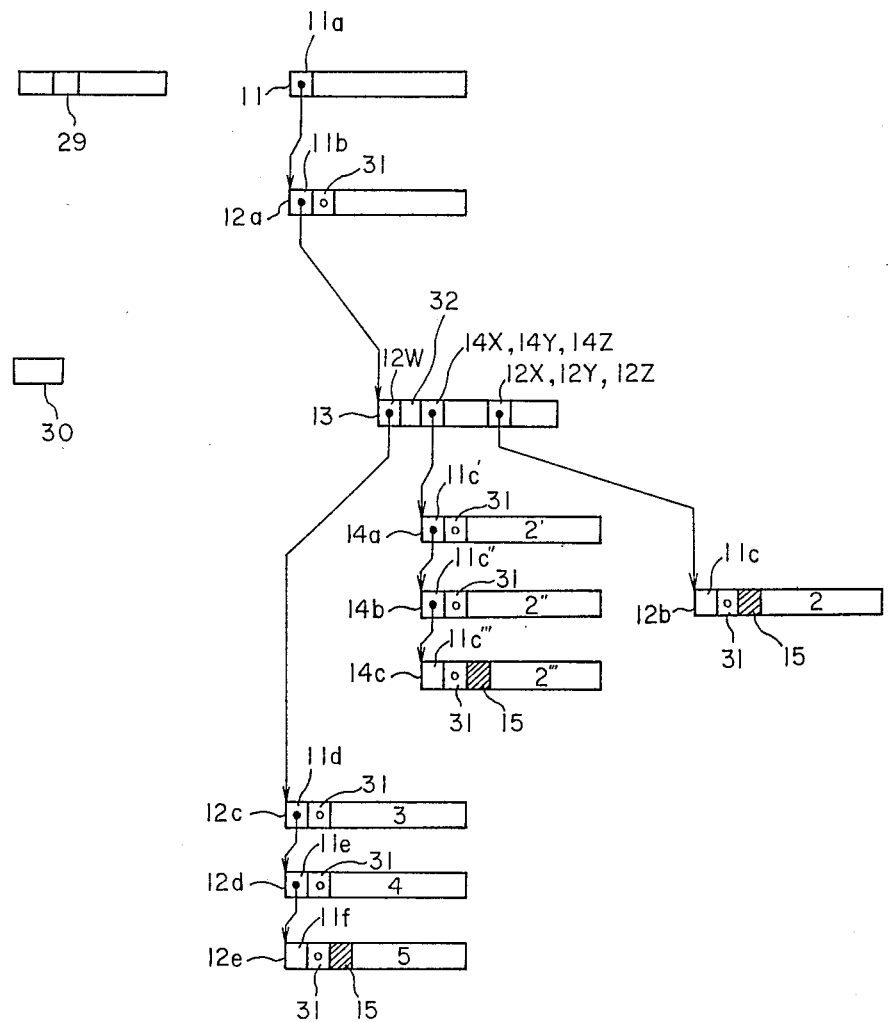
FIG. 6 is a diagram showing a memory chain structure to be displayed, after being edited or proofread in the memory of the word processor of the present invention.
Figure 7:
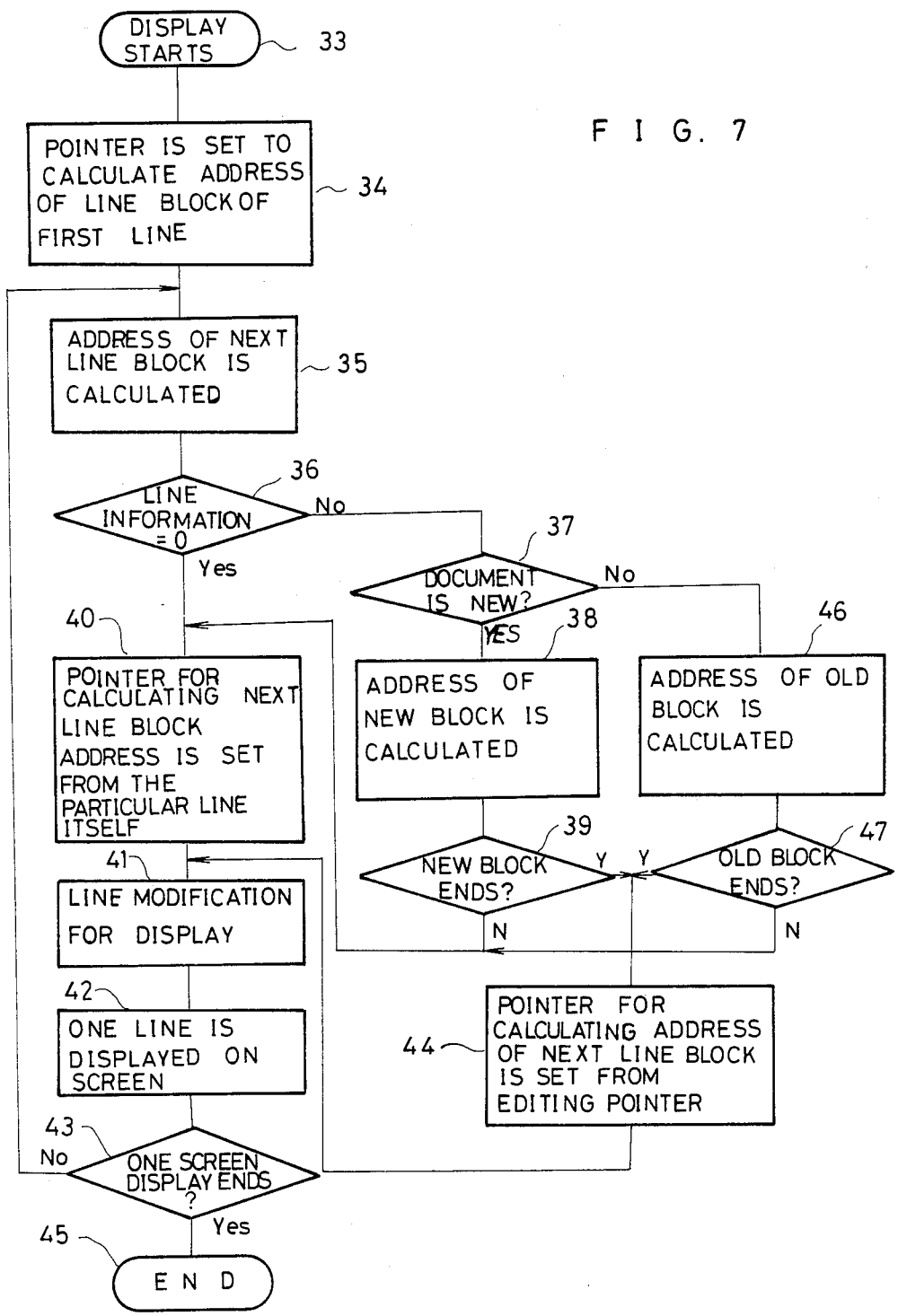
FIG. 7 is a flow chart for explaining the operation of the memory chain structure illustrated in FIG. 6.

FIG. 6 shows a memory block chain structure after editing or proofreading, similar to that of FIG. 4B, while FIG. 7 is a flow chart for displaying new and old line block chains.

In FIG. 6, numeral 29 designates a display address pointer, and numeral 30 a flag for discriminating new and old line blocks. They are instructed from within the document administration portion 6 shown in FIG. 3. Data "1" is a flag for selecting the new line blocks 14a, 14b, 14c, etc., and data "0" is a flag for selecting the old line blocks 12b, etc.

Also in FIG. 6, data "0" or "1" added behind pointer information 11b, 12W, 11c, 11c′, 11c″, 11c‴, 11d and 11f is a flag indicating whether the corresponding memory block is the data of one line of a document or the data of an editing or proofreading pointer. That is, "0" denotes line information 31, while "1" denotes editing or proofreading information 32.

FIG. 7 is the flow chart of the displaying operation. When the displaying operation has been started at Step 33, a base pointer 11 is set at Step 34 in order to calculate the address of the line block 12a of the first line. After the setting, the address of the line block of the second line is calculated at Step 35. In this case, the second line is replaced with the editing or proofreading pointer 13 which has the flag "1". Therefore, a search 36 for line information="0" results in "No". Whether or not the document is a new one is checked at Step 37. Upon the detection of the editing or proofreading pointer, the line information has the flag set so as to remain at "1" until the end of a new or old block is detected. Here, the check 37 as to the new document is performed using a flag from the document administration portion 6. When "1" is raised as this flag, the pointer address 11c′ of the new line block 14a is calculated at Step 38, and if the new block has ended is checked at Step 39. When the new block has not ended, Step 39 proceeds to Step 40 at which a pointer for calculating the next pointer address 11c″ is set from the particular line itself. After performing a line modification 41 (such as reversal printer) for display, the character display of the portion of the new block 14a or one-line screen display is made on the display screen of a CRT or the like at Step 42. The next step 43 checks if one-screen display has ended. When the display has not ended, the control flow is repeated along the route 35→36→37→38→39→40→41→42 until the respective lines of the new line blocks 14b and 14c are displayed. In displaying the last new line block 14c, when line block end information 15 has been detected, a pointer for calculating the address of the next line block is set from the editing or proofreading pointer 13 at Step 44. Thereafter, the new block 14c is subjected to the line modification at Step 41 and is displayed at Step 42.

Subsequently, the line blocks 12c, 12d and 12e which have had no influence on the editing or proofreading are displayed successively one by one along a route 35→36→40→41→42→43→35. When Step 43 has detected the line block end information 15 in the line block 12e (the screen display end), the displaying operation ends as indicated at numeral 45. At Step 44 for setting the pointer, the aforementioned flag for ending the display of the new or old line is rendered "0". The display processing of the line exerting no influence on the editing or proofreading is performed owing to the flag "0".

On the other hand, when Step 37 has detected that the line information flag indicates an old document, the address of the old line block 12b is calculated at Step 46. The next step 47 checks if the old block has ended. Subject to "No", a loop path along 40→41→42→43→35→36→37→46→47 is repeated. When the line block end information 15 has been detected at Step 47, the last old line block is displayed by a route extending along 47→44→41→42. Thereafter, likewise to the foregoing, the line blocks 12c, 12d and 12e exerting no influence on the editing or proofreading are successively displayed along the route 43→35→36→40→41→42→43. When the line block end information 15 of the last line block 12e has been detected at Step 43, the control flow ends as indicated at numeral 45.

In order to bring the document after the editing or proofreading back to the document before the same, the editing or proofreading pointer 13 is restored, the addresses etc. are added, the new block chains 14a, 14b and 14c after the editing of the erroneous editing or proofreading pointer are erased, the block 12b before the editing or proofreading is directly chained to the portions chained by the erroneous editing or proofreading pointer 13, namely, the line blocks 12c, 12d and 12e, and this editing pointer is erased. As a result, the document before the editing or proofreading illustrated in FIG. 4A is restored. Conversely, in a case where the chain of the blocks before the editing or proofreading is unnecessary, the processing of erasing the line block chain 12c, 12d and 12e before the editing or proofreading, chaining the edited or proofread block chain directly to the document blocks and erasing the editing pointer may be performed contrariwise to the above case of restoring the original state.

Since the present invention is constructed and operated as described above, an edited result can be immediately acknowledged on a display screen, and moreover, the position and state of a character string before editing can be seen at any time. Further, a document after the execution of the editing can be brought back to a document before the editing in single editing unit, so as to acknowledge a position and an area after the editing or proofreading. Besides, a large memory capacity is not required because of the execution of a hierarchical administration wherein an editing or proofreading pointer is generated at the time of the editing and wherein each line of the document is administered as one memory block.

What is claimed is:

1. An apparatus for editing and proofreading a document having rows of data thereon, comprising:
    means for storing the document data in a memory by assigning one row of the document data to one memory block, and for chaining each row of document data into an initial chain construction by using a pointer in the memory block;
    means for providing pointer data when editing or proofreading said document data to enable the pointer to manage the chain construction of each row after editing or proofreading is conducted;

selection means including,
means for releasing the management of said pointer data and returning the document data to said initial chain construction in the memory when the document data is returned to the status it was before the editing and proofreading; and
means for refreshing the document data based on the chain construction of each row after the editing or proofreading when the document data is not returned to the status before the editing or proofreading.

2. A document creating and editing apparatus as defined in claim 1, wherein in chaining the respective lines in single memory block unit, said pointer means include a head address of the next row being provided at a head of the memory block.

3. A document creating and editing apparatus as defined in claim 2, wherein the pointer means includes the head address of the next row before the editing or proofreading and the head address of the next row after the same.

4. A document creating and editing apparatus as defined in claim 1, wherein the memory block which constructs one row has a flag which denotes a final sentence.

5. A document creating and editing apparatus as defined in claim 1, wherein the pointer means has the same data block structure as that of one row of the document, and a flag is raised for discriminating the data block of the pointer and the data block of one row of the document.

6. A document creating and editing apparatus as defined in claim 1, wherein the pointer means includes also edit or proofread starting character position information or ending character position information.

7. A method of editing and proofreading a document having rows of data thereon, comprising the steps of:
storing the document data in a memory by assigning one row of the document data as one memory block and chaining each row of document data into an initial chain construction by using a pointer in the memory block;
providing pointer data when editing or proofreading document data to enable the pointer to manage the chain construction of each row after editing or proofreading is conducted; and
selecting one of a releasing step and a refreshing step, wherein said releasing step comprises,
releasing the management of said pointer data and returning the document data to said initial chain construction in the memory when the document data is returned to the status it was before the editing and proofreading, and, wherein said refreshing step comprises refreshing the document data based on the chain construction of each row after the editing or proofreading when the document data is not returned to the status before the editing or proofreading.

8. The method of claim 7, wherein in chaining the respective rows in single memory block units, a head address of a next row of said document data is provided at a head of a memory block.

9. The method of claim 8, wherein said pointer data includes the head address of the next row of document data before the editing or proofreading, and the head address of the next row of documents data after the editing or proofreading.

10. The method of claim 7, wherein a memory block unit which comprises one row of said document data includes a flag which denotes a final sentence of said document data.

11. The method of claim 7, wherein said pointer data has the same memory block structure as that of one row of said document data, and a flag being provided for discriminating a memory block unit of said pointer data from a memory block unit of said document data.

12. The method of claim 7, wherein said pointer data includes at least one of (i) edit or proofread starting character position information, and (ii) ending character position information.

* * * * *